Inventors:
WILLY RUDSZINAT
OTTO ERDMANN

Inventors:
WILLY RUDSZINAT
OTTO ERDMANN

BY Michael S. Striker
their ATTORNEY

Inventors:
WILLY RUDSZINAT
OTTO ERDMANN

BY Michael S. Striker
their ATTORNEY

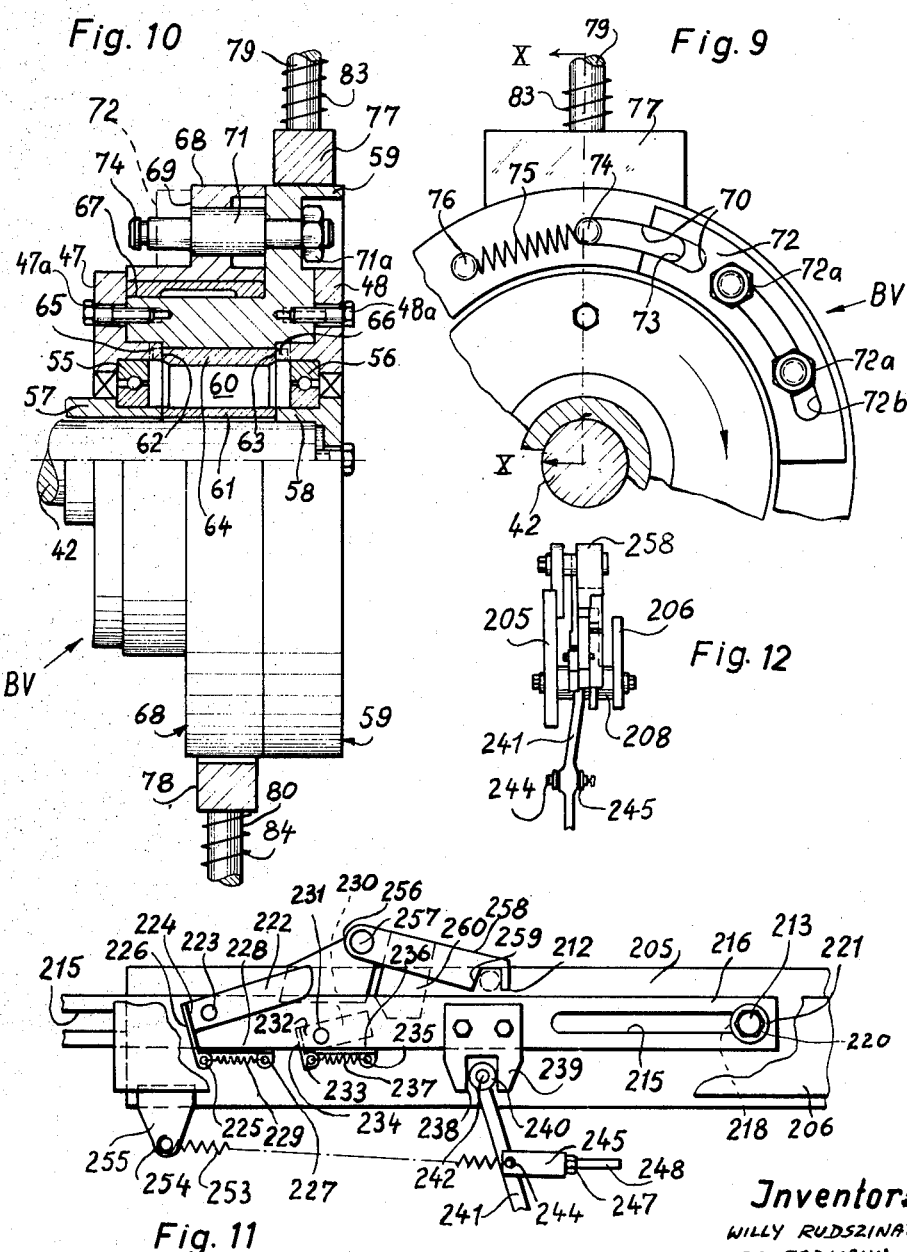

May 10, 1966  W. RUDSZINAT ET AL  3,250,056
MACHINE FOR MAKING AND HANDLING CIGARETTES
AND SIMILAR ARTICLES
Filed July 10, 1962  10 Sheets-Sheet 9

Inventors:
WILLY RUDSZINAT
OTTO ERDMANN

BY Michael J. Striker
their ATTORNEY

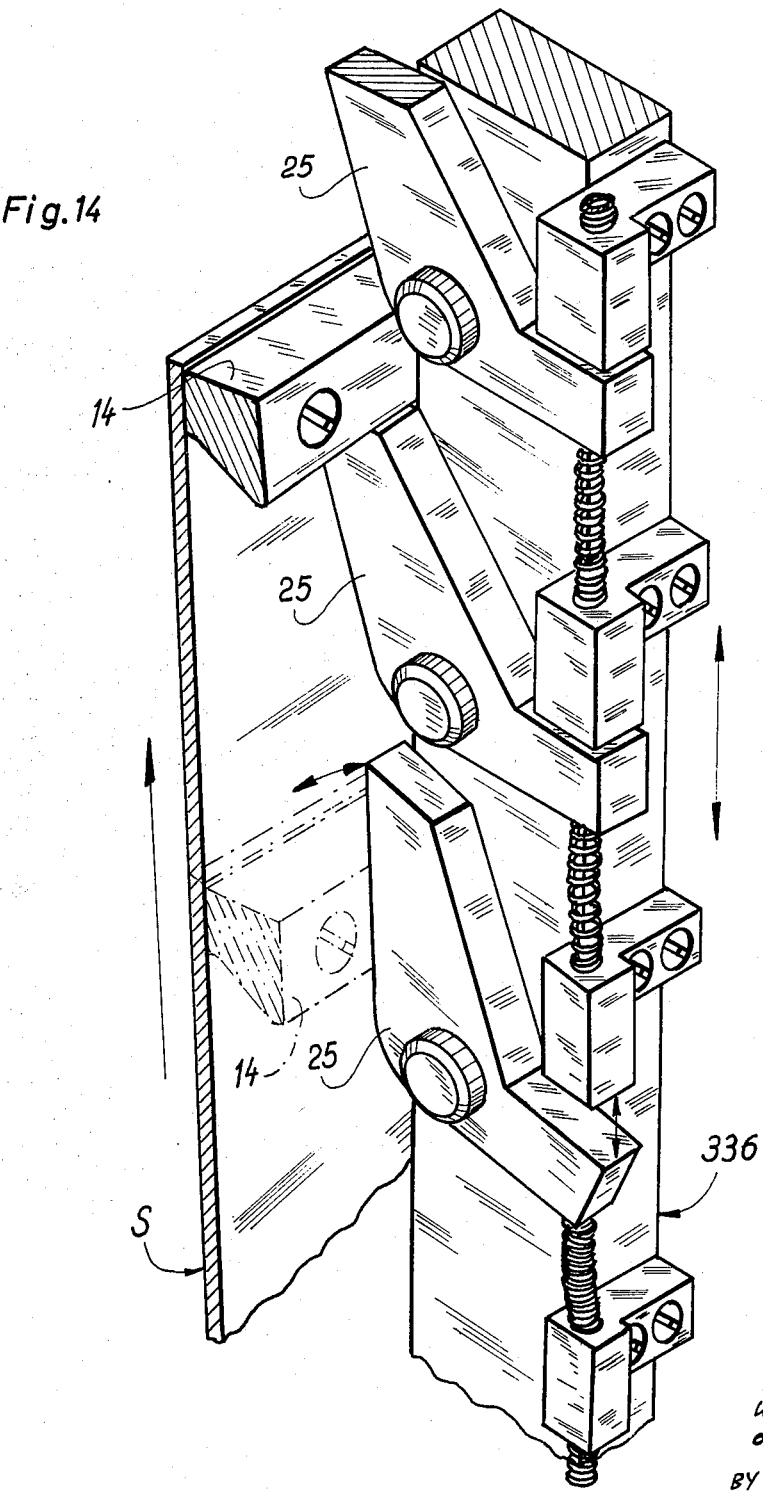

United States Patent Office 3,250,056
Patented May 10, 1966

3,250,056
MACHINE FOR MAKING AND HANDLING CIGARETTES AND SIMILAR ARTICLES
Willy Rudszinat, Hamburg-Lohbrugge, and Otto Erdmann, Hamburg-Bergedorf, Germany, assignors to Hauni-Werke Koerber & Co. K.G., Hamburg, Germany
Filed July 10, 1962, Ser. No. 208,737
Claims priority, application Great Britain, July 12, 1961, 25,227/61
16 Claims. (Cl. 53—236)

The present invention relates to machines for making and handling cigarettes, cigars, cigarillos, filters and other products which by themselves or together with other products constitute tobacco-containing articles. More particularly, the invention relates to apparatus which form part of such machines and which are used to circulate storing devices between a magazine and a loading or transfer assembly at which cigarettes or similar articles are transferred into the storing devices. Still more particularly, the invention relates to a circulating apparatus which is especially suited for use in machines of the type disclosed in a copending application Serial No. 181,669, of Horst Kochalski et al., filed March 22, 1962, now Patent No. 3,190,459, to which reference may be had if necessary. Hereinafter, the products accommodated in storing devices handled by the apparatus of our invention will be referred to as cigarettes but it is evident that the storing devices may accommodate other types of goods.

It is an important object of our invention to provide a fully automatic but nevertheless comparatively simple apparatus for consecutively advancing empty storing devices to and for consecutively removing filled storing devices from a loading or transfer station in such a way that empty storing devices moving toward the transfer station cannot interfere with the loading of storing devices and that storing devices moving along the loading station cannot interfere with movements of filled storing devices or vice versa.

Another object of the invention is to provide an apparatus of the just outlined characteristics which cooperates with a magazine for storing devices and which is constructed and assembled in such a way that the space on the magazine which is vacant upon removal of an empty storing device may be occupied by a filled storing device so that the magazine need not change its position with respect to the circulating apparatus or vice versa between withdrawals of two consecutive empty storing devices from the magazine.

A further object of the invention is to provide an apparatus of the above outlined characteristics wherein the storing devices always remain in upright position so that goods stored therein are prevented from changing their positions with respect to each other during return movement of a filled storing device into or onto the magazine.

An additional object of the instant invention is to provide an apparatus for circulating cigarette-containing storing devices and similar containers in such a way that, at one stage of their movement, the storing devices may be gradually filled with cigarettes while at the same time advancing in a path leading ultimately back to the magazine.

With the above objects in view, the invention resides in the provision of a machine for making and handling cigarettes and similar articles which comprises a magazine adapted to support a supply of storing devices, an assembly for transferring articles into empty storing devices, and an apparatus for circulating empty storing devices from the magazine toward and along the transferring assembly and back to the magazine. The circulating apparatus comprises means for consecutively advancing empty storing devices in a first path from the magazine toward the transferring assembly and for consecutively returning in a second path to the magazine such storing devices which are filled while moving along the transferring assembly. The two paths have coinciding portions which terminate at the magazine so that a filled storing device may be deposited in space which is vacated upon removal of an empty storing device from the magazine.

The novel features which are considered as characteristic of the invention are set forth in particular in the appended claims. The invention itself, however, both as to its construction and its method of operation, together with additional objects and advantages thereof, will be best understood from the following detailed description of a specific embodiment with reference to the accompanying drawings, in which:

FIG. 1 is a diagrammatic top plan view of a cigarette making and handling machine comprising a circulating apparatus for trays or similar storing devices which embodies our invention;

FIG. 2 is a diagrammatic perspective view of a cigarette transferring or loading assembly at which trays circulated by the apparatus of our invention receive rows of cigarettes, further showing a magazine which accommodates a series of filled and empty trays and which cooperates with the circulating apparatus to insure that the transfer station of the loading assembly always receives an empty or partially filled tray when the machine is in actual use;

FIG. 9 is a fragmentary end elevation view of a brake mechanism for trays descending along the transfer station of the machine shown in FIG. 1;

FIG. 10 is a partly side elevational and partly axial sectional view of the brake mechanism, the section of FIG. 10 being taken along the line X—X of FIG. 9;

FIG. 11 is a fragmentary side elevational view of the arrangement which advances the magazine along the circulating apparatus in synchronism with the operation of the machine shown in FIG. 1;

FIG. 12 is an end elevational view of certain parts of the arrangement as seen from the left-hand side of FIG. 11;

FIG. 14 is a perspective view of part of the tray lifting mechanism.

Figure 1:
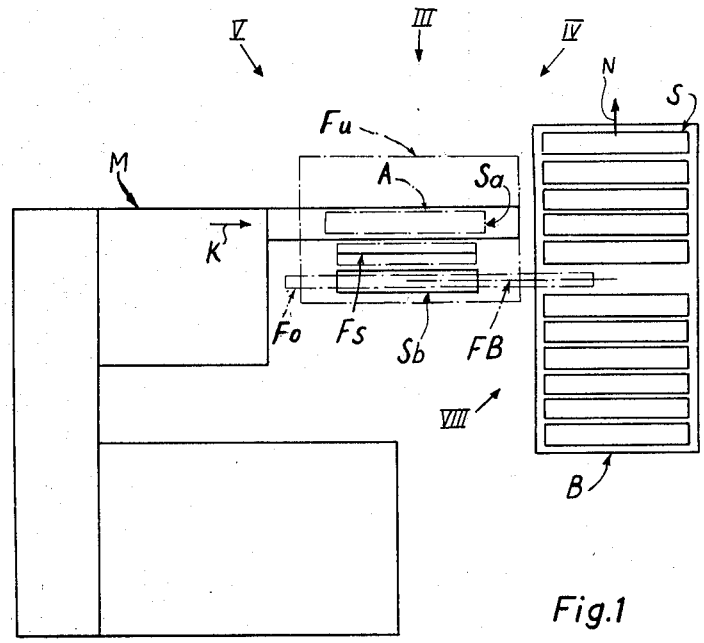

Referring now in greater detail to the drawings, and first to FIG. 1, there is shown a cigarette making and handling machine which embodies the circulating apparatus of our invention. The machine comprises a cigarette making apparatus M of the type disclosed in the aforementioned application Serial No. 181,669 which delivers a series of cigarettes in a direction indicated by the arrow K so that the longitudinal extensions of the cigarettes are substantially perpendicular to such direction. The cigarettes discharged by the apparatus M are continuously or intermittently advanced to a loading or transfer station Fs in a loading or transfer assembly Fu, and this transfer assembly accommodates a specially constructed row forming device or lifter A (fully described in the application Serial No. 181,669) which assembles the cigarettes into rows of closely adjacent articles prior to transfer of such rows into storing devices or trays S one of which (see the phantom-line tray Sa) is always located at the transfer station Fs. The rows of cigarettes formed by the lifter A are stacked upon each other in such a way that cigarettes forming a newly assembled row are deposited in gaps defined by the uppermost row of cigarettes already accommodated in the tray Sa and, therefore, the transfer assembly Fu comprises a staggering means which reciprocates the tray Sa with respect to the lifter A (in and counter to the direction indicated by the arrow K) or vice versa. Such staggering means is fully described in the application Serial No. 181,669. For the sake of simplicity, it should be assumed that the staggering means cooperates with the lifter A so that the tray Sa need not be reciprocated while moving along the transfer station Fs.

Since the consecutively assembled rows of cigarettes are stacked upon each other, the machine shown in FIG. 1 must be constructed in such a way that the tray Sa descends through a predetermined distance subsequent to transfer of each newly assembled row until the stack of cigarettes in this tray attains a desired height. Moreover, the machine must comprise means for moving an empty tray into requisite position to receive a first row of cigarettes as soon as the tray Sa is filled since the operation of the lifter A should not be interrupted when the tray Sa is filled to make sure that the machine may assemble cigarettes into rows of requisite length at the same time at which the cigarettes are being delivered to the transfer station Fs.

Our invention resides in the provision of an apparatus which is preferably integrated into the transfer assembly Fu and which is utilized for circulating trays S in two paths from a repository or magazine B toward and along the transfer station Fs and back to the magazine B in such a way that an empty tray is always in a position to receive rows of cigarettes assembled by the lifter A and that movements of the empty tray are not interfered with by movements of a filled tray which is being returned to the magazine B while a tray receives a requisite number of rows at the station Fs, or by movements of a next empty tray which is advanced toward the transfer station after the filled tray comes to rest in or on the magazine B in a space of this magazine previously occupied by the tray which is caused to descend along the transfer station. In order to render the delivery and withdrawal of trays fully automatic, the apparatus of our invention preferably comprises a wheel-mounted or otherwise readily movable magazine in the form of a conveyance or pushcart which can accommodate a reasonably large supply of trays and which is preferably coupled to the circulating apparatus in such a way that it moves through a distance corresponding to the thickness of a tray immediately or shortly after a filled tray is returned to the magazine.

Figure 2:
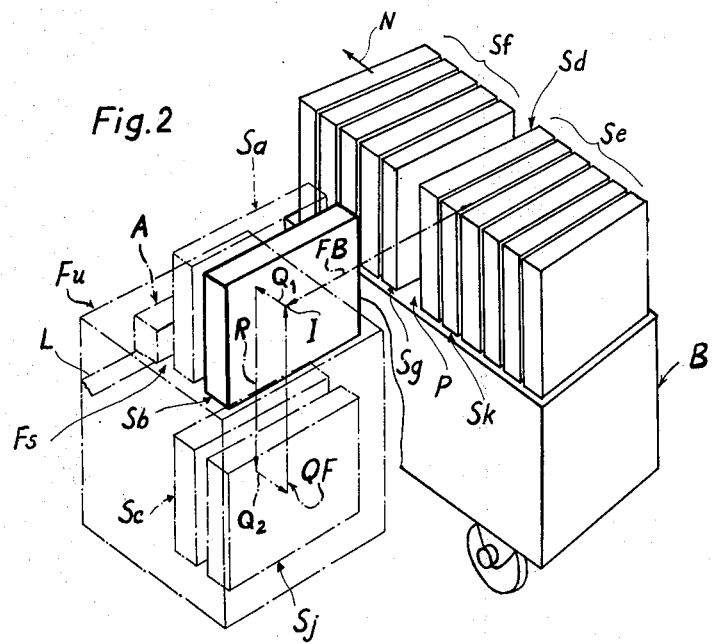

Before proceeding with a detailed description of the circulating apparatus, we will shortly outline the principle of operation of this apparatus with reference to FIG. 2 which shows a magazine B in the form of a wheel-mounted pushcart, the transfer assembly Fu, the lifter A which is provided at the transfer station Fs of the assembly Fu, and the upper run of an endless band conveyor L which serves as a means for delivering a series of cigarettes to the lifter A.

In acordance with our invention, the magazine B (which is assumed to support a supply Sf of filled trays and a supply Se of empty trays) is coupled to the circulating apparatus of our invention and the cigarette making and handling machine comprises means for intermittently advancing the magazine (arrow N) through distances equal to the spacing between the nearest trays of the supplies Sf and Se, i.e., through a distance which at least equals the thickness of a single tray. In FIG. 2, the rearmost filled tray Sg (to wit: that tray which was filled with cigarettes subsequent to the filling of other trays in the group Sf) is aligned with the tray Sa, the latter being shown in a position in which it is ready to receive a first row of cigarettes from the lifter A. The space P between the rearmost filled tray Sg and the foremost empty tray Sd is wide enough to accommodate a single tray. This space has accommodated the tray Sa prior to last advance of the magazine B in the direction indicated by the arrow N.

In the first step, a reciprocable first part or arrangement of the advancing means Fo (see FIG. 1) has moved the tray Sa along a substantially horizontal first path FB in a direction indicated by the arrow so that the tray was removed from the magazine B while remaining in parallelism with itself and that the tray has been moved to a position rearwardly of the transfer station. The tray Sa then occupies a position which is occupied in FIG. 2 by a tray Sb and is already properly aligned with the lifter A excepting that the spacing between the lifter and the tray Sa is greater than at the time this tray is in a position to receive rows of cigarettes at the station Fs.

In the next step, the tray Sa is moved in a horizontal first section $Q_1$ of a second path and in a direction at right angles to the path FB so that it advances toward the lifter A and is in a position to receive a first row of cigarettes. At the same time, a newly filled tray Sc is in vertical alignment with the tray Sa but is located therebelow so that the tray Sa may be moved along the section $Q_1$ by a second part of the advancing means which will be described in connection with FIGS. 3 to 5 and 8.

In a third step, the tray Sa is intermittently lowered in a vertical second section R of the second path through distances whose length corresponds substantially to the diameter of a cigarette (i.e., through distances necessary to insure that a newly assembled row of cigarettes is deposited in gaps defined by the uppermost row of cigarettes already accommodated in the tray Sa). When the tray Sa receives a requisite number of cigarettes, it is permitted to descend further so as to occupy the space occupied in FIG. 2 by the tray Sc.

In a fourth step, the tray Sa is engaged by a further part of the advancing means which moves it along a horizontal third section $Q_2$ of the second path in a direction counter to the direction of advance along the section $Q_1$, i.e., away from the lifter A, until the tray Sa assumes a position at a level below but in vertical alignment with the position it had assumed after having terminated its advance along the first path FB. This position is occupied in FIG. 2 by a phantom-line tray Sj, and it will be noted that the tray Sj is in vertical alignment with the tray Sb.

In a fifth step, the tray Sa (now occupying the position Sj) is engaged by a further part of the advancing means which lifts it along a vertical section QF of the second path until the tray Sa reaches a position corresponding to its position at the end of the first path FB, namely, a position corresponding to that of the tray Sb shown in FIG. 2. As stated hereinabove, that part of the advancing means which moves the trays along the first path FB is reciprocable so that it may engage the tray Sa (in the position Sb) and returns the tray along the last section or portion of the second path and onto the magazine B. However, the tray Sa (which is now filled) does not return into the space P but rather into the space previously occupied by the empty tray Sd. This is due to the fact that, with the execption of a short period of time subsequent to return of a filled tray onto the magazine B, the apparatus of my invention circulates two trays in the composite path defined by the first path FB and by the second path which includes a first portion comprising the sections $Q_1$, R, $Q_2$, QF (all located in a common vertical plane) and a second portion which coincides with the path FB. Thus, while an empty tray (such as the tray $Sa$ of FIG. 2) is permitted to descend along the section R, a newly filled tray (such as the tray $Sc$) is caused to move along the sections $Q_2$, QF and along that portion of the second path which coincides with the first path FB back onto the magazine B to occupy the space P, whereupon the magazine is advanced in the direction indicated by the arrow N in order to move the empty tray $Sd$ into alignment with the first path FB. The tray $Sd$ is thereupon advanced along the first path FB and along the section $Q_1$ to assume the position which is occupied in FIG. 2 by the tray $Sa$ before or at the time the tray $Sa$ is filled so that the bottom wall of the tray $Sd$ may receive that row of cigarettes which is assembled by the lifter A subsequent to transfer of the uppermost row of cigarettes into the tray $Sa$. The tray $Sa$ is then moved along the sections $Q_2$, QF and along that portion of the second path which coincides with the first path FB to occupy the space vacated by the tray $Sd$, and the magazine B is again advanced through a distance corresponding to the thickness of a tray in order to move the next empty tray $Sk$ into alignment with the first path FB. It will be readily understood that there is ample time for return of the tray $Sc$ onto the magazine and for movement of the tray $Sd$ into the position occupied in FIG. 2 by the tray $Sa$ because movements of the tray $Sa$ along the section R are intermittent whereas the movements of trays along the first path FB and along the sections $Q_1$, $Q_2$ and QF may take place without any or with short interruptions.

Figure 3:
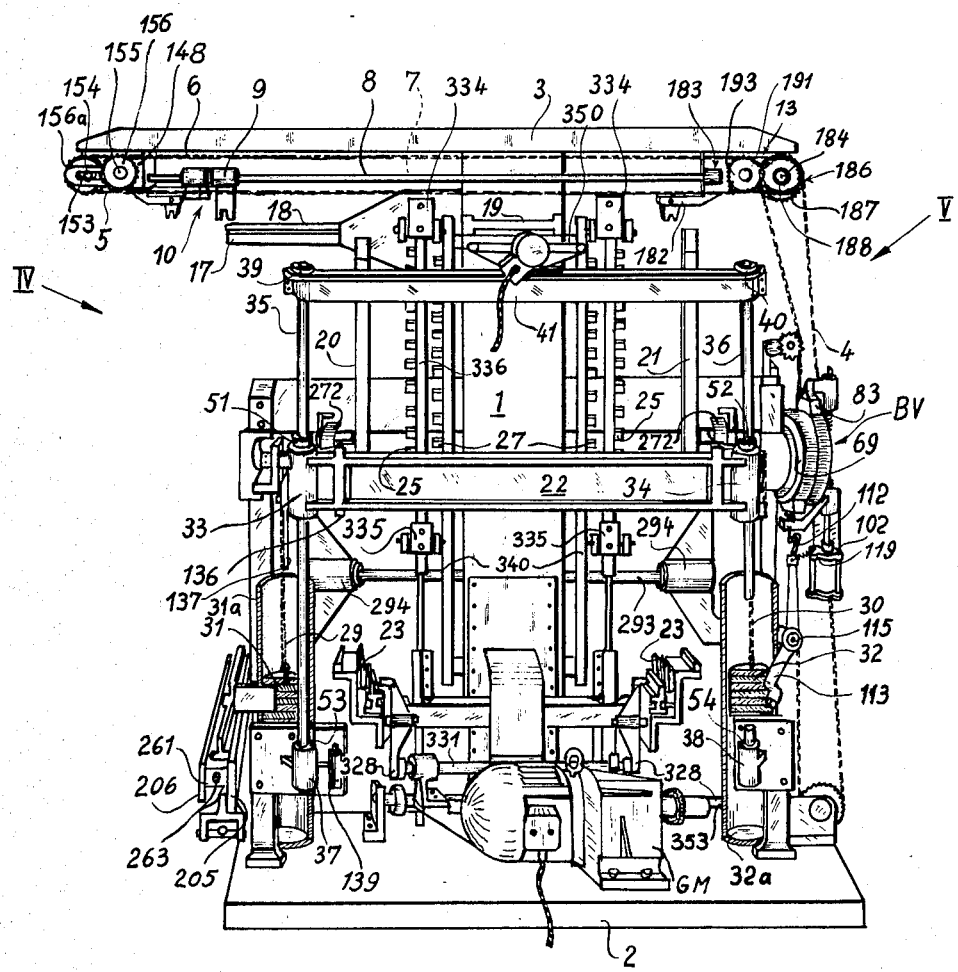
FIG. 3 is a perspective front elevational view of the circulating apparatus as seen in the direction of arrow III in FIG. 1.

FIG. 3 illustrates the circulating apparatus in a front elevational view as seen in the direction of arrow III in FIG. 1. The apparatus comprises a base 2 which supports a main beam or upright 1 of adjustable height. At its upper end, the upright 1 carries a horizontal crosshead 3 which supports the aforementioned reciprocable first part Fo of the advancing means. This part of the advancing means comprises two endless chains 5, 6 which are driven in opposite directions by an endless chain 4, a pair of horizontal guide rods 7, 8 for spherical sleeves of a reciprocable carriage 9 which moves back and forth along the aforementioned first horizontal path FB, a first reversing mechanism 10 for the carriage 9 (see also FIG. 5) adjacent to that end of the crosshead 3 which is nearer to the magazine B (this magazine is located at the left-hand side of the circulating apparatus, as viewed in FIG. 3), a second reversing mechanism 11 for the carriage 9 which is located at the other end of the crosshead 3 (see FIGS. 4 and 6), an impulse transmitting or tripping mechanism 12 (see FIG. 7) which is actuated by the carriage 9 at the time the first part Fo of the advancing means returns a filled tray onto the magazine B to cause forward movement of the magazine in the direction of arrow N shown in FIG. 2, and a transmission 13 which constitutes an operative connection between the driver chain 4 and the driven chains 5, 6.

Figure 7:
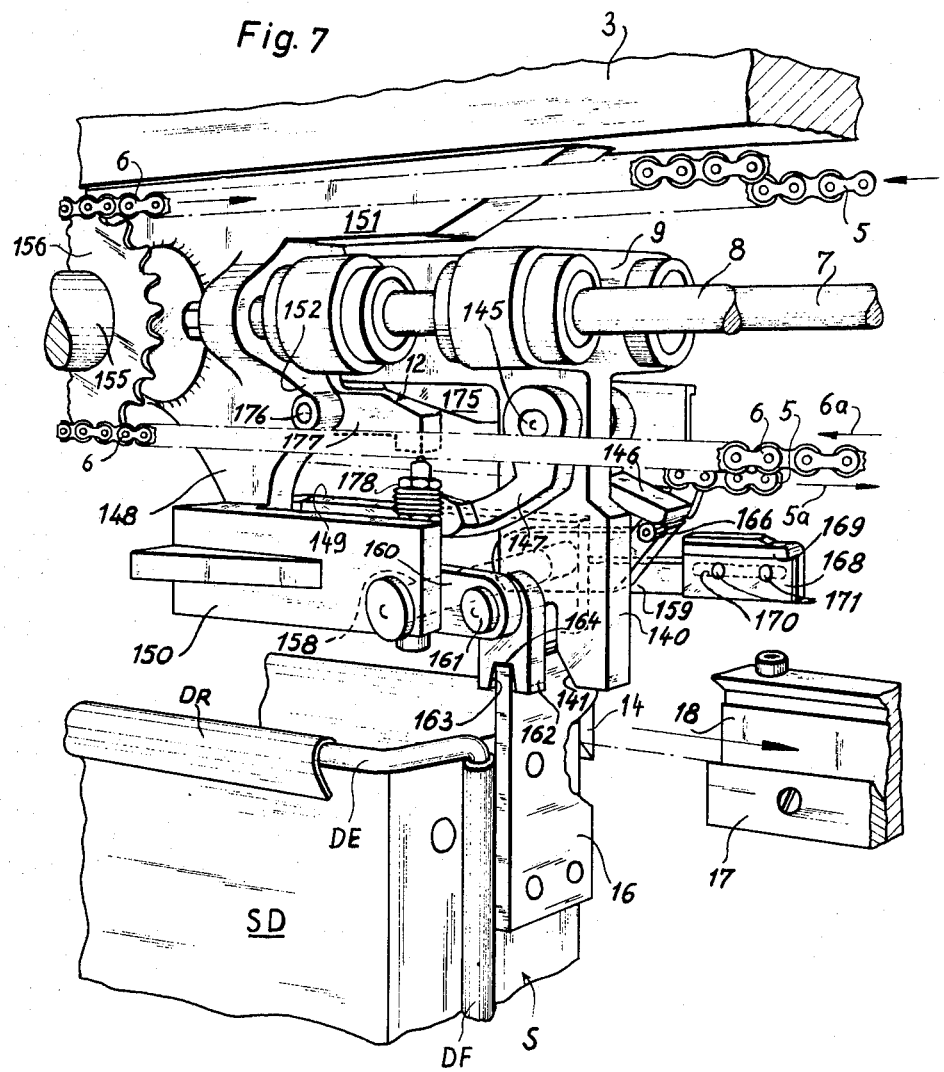
FIG. 7 is an enlarged perspective detail view of the structure shown in the upper left-hand corner of FIG. 3.

As shown in FIG. 7, each tray S comprises a cover SD for the open front side thereof. This cover is slidable in a vertical plane and its projecting upper edge portion assumes the form of a flange DR which is bent about a horizontal holder bar DE. The end portions of the bar DE are bent downwardly and are slidable in vertical bearing sleeves DF provided on the side walls of the tray S. Each tray is further provided with a horizontal suspension batten 14 (see FIG. 8) which is located at the upper end of its rear wall, with a horizontal supporting batten 15 adjacent to the lower edge of its rear wall (FIG. 8), and with a lug 16 which extends upwardly from one of its side walls (see FIGS. 4, 7 and 8), i.e., from that side wall which faces away from the magazine B.

When the carriage 9 removes a tray from the magazine B, the batten 14 engages and slides along a fixed guide rail 17 (FIGS. 3-5 and 7) secured to a bracket 18 carried by the upright 1. At the same time, the batten 15 engages with suitable ways on the upright 1 (FIG. 8) to hold the tray against tilting and in parallelism with itself while the tray moves along the crosshead 3. The rail 17 is aligned with a pivotable rail 19 which is spaced therefrom and which is located in front of and is secured to the upright 1 (see FIG. 3). The rail 19 is located at the intersection of the first path FB with the sections QF, $Q_1$ of the second path (shown in FIG. 2), i.e., it is located rearwardly of the transfer station Fs.

Figure 4:
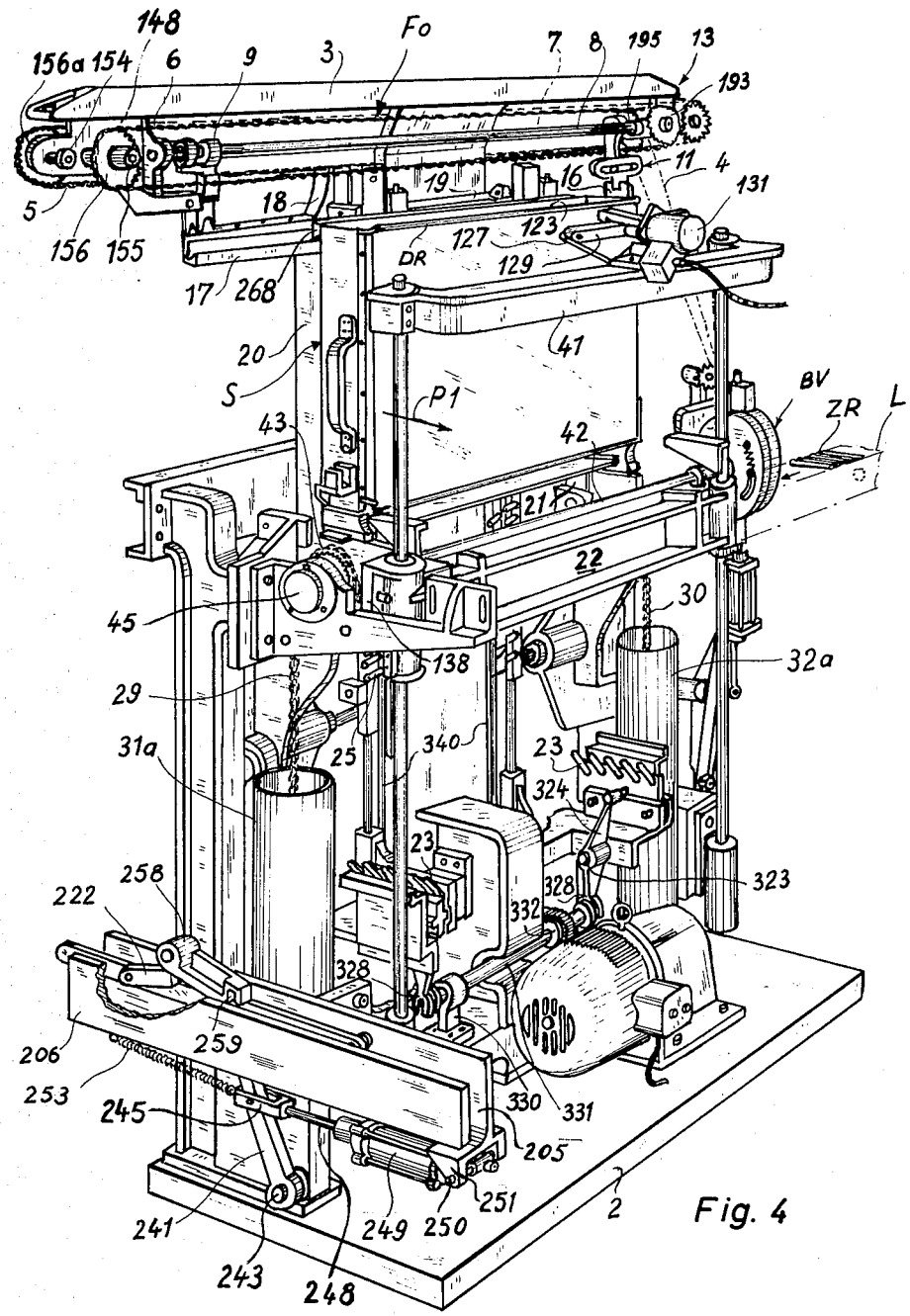
FIG. 4 is another perspective view of the circulating apparatus substantially as seen in the direction of arrow IV in FIGS. 1 and 3.

A tray S which has reached this intersection and whose batten 14 is suspended on the pivotable rail 19 is thereupon engaged by two substantially vertical transporting arms 20, 21 (FIGS. 3-5) which form a second part of the advancing means and are adapted to move the tray along the section $Q_1$ of the second path and to the intersection of this section with the section R. The arms 20, 21 lift the tray off the rail 19 before the tray is caused to advance along the section $Q_1$. At the upper end of the section R, the tray comes to rest on a horizontal platform 22 which constitutes an element of a third part of the advancing means and which intermittently lowers the tray along the transfer station Fs so that the tray may receive rows of cigarettes and is filled to a desired extent before reaching the intersection of the section R with the lower section $Q_2$. The platform 22 is reciprocable along the section R and supportingly engages the tray S at a time it reaches its uppermost position. When the tray is transferred onto and is supportingly engaged by the platform 22, the arms 20, 21 move at an angle rearwardly and downwardly and thereupon return to their original positions in which they are ready to advance another empty tray along the section $Q_1$. Downwardly oriented movements of the platform 22 and of a tray supported thereon occur by gravity and, as explained hereinabove, such movements are intermittent and are synchronized with the operation of the lifter A so that the tray supported by the platform 22 may be filled with cigarettes before the platform reaches the lower end of the section R. FIG. 4 shows a series of cigarettes ZR on the upper run of the belt L, and it will be noted that the cigarettes are caused to advance toward the transfer station which is located in front of the platform 22.

The movements of the platform 22 and of a tray thereon are controlled by a specially constructed brake mechanism BV which causes the platform to descend intermittently while the tray is being filled and to descend without further interruptions when the tray has received a requisite number of cigarettes. When the platform 22 reaches its lowermost position (FIG. 5), the tray is engaged by a further part of the advancing means including two sets of tiltably mounted reciprocable teeth 23 which are effective while moving in a direction from the section R toward the section QF so as to entrain the tray along the section $Q_2$. The movements of the tray along the section $Q_2$ are intermittent because the teeth 23 move back and forth and advance the tray in stepwise fashion. The construction of such teeth is well known in the art.

As soon as the tray reaches the intersection of the sections $Q_2$ and QF, it comes into the range of a further part of the advancing means which includes two sets of tiltably mounted reciprocating teeth 25 adapted to advance the tray while moving upwardly so that the tray is gradually lifted toward the first path FB. The teeth 25 engage central portions of the batten 14 and are assisted by spring-biased teeth 27 which do not reciprocate with the teeth 25 and which supportingly engage the batten 14 with the teeth 25 move downwardly. The teeth 25 and 27 are disposed in two pairs of vertical rows between the arms 20, 21, (see also FIG. 14).

When the tray reaches the upper end of the section QF, its batten 14 pivots the rail 19 sidewise and this rail thereupon returns to its original position to engage the batten 14 and to thereby support the tray at the left-hand end of the path FB, as viewed in FIG. 2. In the final step, the carriage 9 moves the tray along the second portion of the second path which coincides with the first path FB and along the fixed rail 17 so that the tray returns onto the magazine B.

We will now describe in greater detail various mechanisms which transmit impulses to the advancing means in order to move a tray along the first path FB, and along the second path (including a first portion consisting of sections $Q_1$, R, $Q_2$, QF and a second portion which coincides with the path FB) from the magazine B, along the transfer station Fs, and back to the magazine.

The reversing mechanism 10 and the impulse transmitting or tripping mechanism 12 are shown in FIG. 7. The underside of the carriage 9 supports a downwardly extending profiled bar 140 having in its underside a cutout 141 which extends at right angles to the direction of the first path FB and which receives the lug 16 of an empty tray S (for example, the tray Sd of FIG. 2) when the magazine B has been caused to advance by a step in the direction of arrow N. At a point rather closely below the carriage 9, the bar 140 is provided with a bore for a turnable bolt 145 whose end portions carry motion transmitting ratchet levers 146, 147 which are disposed at opposite sides of the bar 140 and which are inclined with respect to each other in such a way that one thereof (147) may engage the chain 6 when the other thereof (146) is spaced from the chain 5, or vice versa. Thus, when the pawl of the lever 147 engages the chain 6, the carriage 9 is compelled to move with the chain 6. The carriage will be moved in the opposite direction if the pawl of the lever 146 engages the chain 5.

At the leftmost end of the crosshead 3, as viewed in FIGS. 3 and 7, there is provided a bearing member 151 having a central rib 148 and side arms 149, 150. The member 151 is secured to the underside of the carriage. The rib 148 supports the left-hand ends of the guide rods 7, 8 and is provided with an elongated horizontal slot 153 (see FIG. 3) for two adjustable shafts 154, 155 carrying sprocket wheels 156a, 156 for chains 5 and 6. The right-hand ends of the side arms 149, 150, as viewed in FIG. 7, carry a horizontal shaft 158 for levers 159, 160 which are turnable with the shaft 158 and which are located in the space between the arms 149, 150. The angular position of the levers 159, 160 with respect to the shaft 158 may be adjusted. The free end of the lever 160 carries a bolt 161 for a trip 162 which is freely turnable about the bolt 161 and which normally assumes the position of FIG. 7 in which it hangs on the bolt. The lower end face of the trip 162 is provided with a recess 163 whose bottom wall 164 is inclined with respect to the direction of the first path FB.

The lever 159 carries an extension 168 having a horizontal flange 169 which serves as a trip. The extension 168 is provided with an elongated slot 170 for two screws 171 which secure this extension to the lever 159 in such a way that the position of the extension may be adjusted in the longitudinal direction of the first path FB.

The underside of the carriage 9 further supports a block 175 which cooperates with a lever 177, the latter secured to the central rib 148 of the bearing member 151 by bolts 176 (see FIG. 7). The lever 177 controls an air valve 178 for a pneumatic cylinder 249 (FIGS. 4 and 5), and this cylinder forms part of the means for moving the magazine B in the direction of arrow N.

Figure 5:
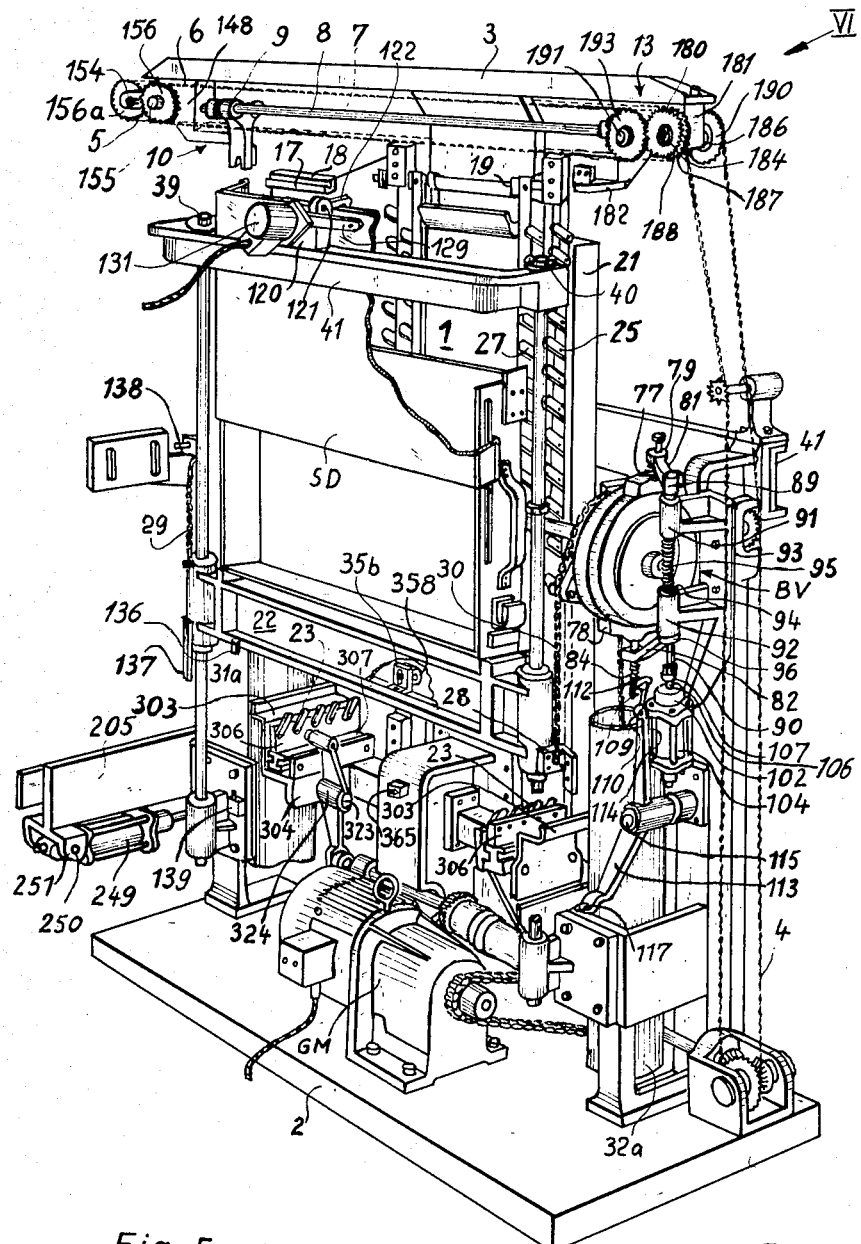
FIG. 5 is a further perspective view of the circulating apparatus substantially as seen in the direction of arrow V in FIG. 1 or 3.
Figure 6:
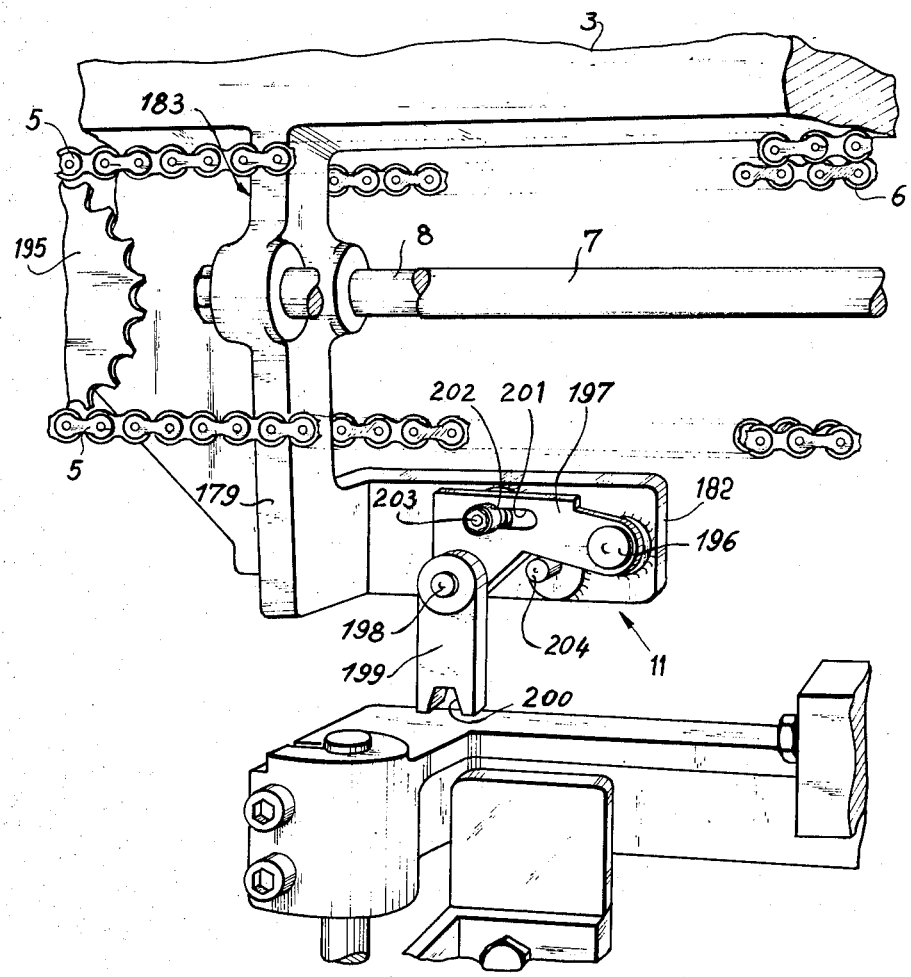
FIG. 6 is an enlarged perspective view of certain parts of the circulating apparatus which are shown in the upper right-hand corner of FIG. 3, the view of FIG. 6 being taken in the direction of arrow VI shown in FIG. 5.

The right-hand end of the crosshead 3 (as viewed in FIG. 3) supports a downwardly extending angular bearing member 183 which is also shown in FIG. 6 and which forms part of the reversing mechanism 11. It is to be noted that FIG. 6 shows the rear side of the structure illustrated in the upper righthand corner of FIG. 3. The bearing member 183 comprises a vertical leg 179, two hanger or suspension type bearings 180, 181 (FIG. 5) and a side arm 182 (FIGS. 3 and 6). The leg 179 supports the right-hand ends of the guide rods 7, 8, and the bearing 181 supports a rotary shaft 184 (FIGS. 3 and 5) one end of which carries a component 186 of the transmission 13 including a sprocket wheel 187 for the chain 6 and a pinion 188. The other end of the shaft 184 carries a sprocket wheel 190 for the chain 4. The latter is driven by the main shaft 353 of a gear motor GM (see FIG. 3).

The bearing 180 mounts a shaft 191 one end of which carries a gear 193 meshing with the pinion 188 and the other end of which carries a sprocket wheel 195 for the chain 5. Thus, the chain 5 is trained around sprocket wheel 156a, 195 and is driven by the sprocket wheel 190 through the shaft 184 and gear train 188, 193. The other chain 6 is trained around sprocket wheels 156, 187 and is driven by sprocket wheel 190 through the shaft 184.

The free end of the side arm 182 (FIG. 6) carries a bolt 196 rotatably mounting a lever 197, and the free end of this lever carries a bolt 198 for a trip 199 which is similar to the trip 162 and which normally hangs on the bolt 198 so that it recess 200 faces downwardly, this recess extending at right angles to the longitudinal extension of the first path FB.

The median portion of the lever 197 is provided with an elongated horizontal slot 201 receiving an adjustable stud or bolt 203 which carries a roller 202. A pin 204 fixed to the side arm 182 constitutes a stop means for the lever 197 and limits anticlockwise angular movements of this lever, as viewed in FIG. 6.

As explained hereinabove, that portion of the advancing means which moves an empty tray along the upper transverse section $Q_1$ of the second path comprises two transporting arms 20, 21 which are adjacent to vertical side walls of a tray and which can advance the tray in a direction indicated in FIG. 4 by an arrow $P_1$, i.e., in a direction toward the platform 22. Since all parts cooperating with the arm 20 are mirror symmetrical to analogous parts which cooperate with the arm 21, it is sufficient to describe only such parts which cooperate with one of these arms. The arm 20 is mounted on a slide 265 (FIG. 8) and its upper end portion carries a lug 268 (see FIG. 4) which serves as a means for supporting and for entraining a tray S. The slide 265 is hollow and carries two or more downwardly extending bolts for rollers or wheels (not shown) which travel along a beam or rail 272 secured to the frame 41. Additional rollers or wheels are mounted laterally of the slide 265 to guide the latter without play when the arm 20 is to move toward or away from the platform 22. The upper side of the rail 272 is formed with a cam face which causes the arm 20 to move slightly upwardly when the latter reaches the rear end of the section $Q_1$.

The means for moving the slides 265 and the arms 20, 21 along the section $Q_1$ comprises two bell crank levers (FIG. 8) each of which is rockable about a horizontal shaft 293 (see also (FIG. 3), the latter mounted in bearings 294 secured to the frame 41. The longer arm 281 of each bell crank lever is pivotably secured to the respective slide 265 and the shorter arm 295 of one of these levers may actuate a non-illustrated system of switches adapted to arrest the lowermost group of teeth 25 which serve as a means for lifting a tray along the section QF. The free ends of the shorter arms 295 carry a horizontal shaft 296 (FIG. 8) whose central portion is provided with two rings located at the opposite sides of a head 298 provided at the lower end of a piston rod 299 extending into a double-acting pneumatic cylinder 300. This cylinder is pivotally secured to a block 302 by a pin 301, and the block 302 forms part of or is detachably fixed to the frame 41. When the piston rod 299 is caused to perform a downward stroke, the shaft 296 rocks the arms 281 of the bell crank levers in a clockwise direction, as viewed in FIG. 8, and thereby moves the slides 265 in a direction away from the platform 22. By performing an upwardly directed stroke, the piston rod 299 causes the bell cranks to move the slides 265 and the arms 20, 21 toward the transfer station so that a tray suspended on the lugs 268 will move along the section $Q_1$ and may be deposited on the platform 22.

Once the piston rod 299 causes the arms 281 of the bell cranks to advance a tray suspended on the lugs 268 toward the transfer station and onto the platform 22, that part of the advancing means which includes this platform and the brake mechanism BV takes over and lowers the tray along the section R and along the lifter A which latter assemblies consecutive rows of cigarettes for transfer into the tray in order to accumulate in the tray a stack of requisite height. The brake mechanism BV operates in synchronism with the lifter A to make sure that the tray descends through distances necessary to deposit newly assembled rows of cigarettes into gaps defined by the uppermost row of cigarettes already accommodated in the tray. Once the tray is filled, the brake mechanism BV permits the platform 22 to descend to its lowermost position without any further interruptions. The means for transmitting a suitable impulse to the brake mechanism comprises an adjustable trip 28 (see FIG. 5) which is actuated when the tray is full. The trip is mounted on the platform 22 and sends an impulse to the brake mechanism BV when the platform 22 descends through a predetermined distance necessary to accumulate in the tray a requisite number of rows.

The platform 22 is suspended on chains 29, 30 which carry counterweights 31, 32 whose combined weight is such that the platform is automatically lifted when the tray is removed therefrom and that the platform tends to descend when its weight is augmented by the weight of a tray S.

The longitudinal ends of the platform 22 are connected with readily slidable spherical bearing sleeves 33, 34 which slide along vertical guide rods 35, 36. The ends of the rods 35 and 36 are respectively anchored in blocks 37, 39 and 38, 40 which are secured to the frame 41 in a manner as shown in FIG. 3. The chains 29, 30 are trained around sprocket wheels 43 (FIG. 4) mounted on a horizontal shaft 42, and the counterweights 31, 32 are accommodated in tubular shields 31a, 32a mounted on the base 2. FIG. 3 shows that each of weights 31, 32 comprises a group of detachable disks which may be assembled in a manner to insure that the combined weight of the platform 22 plus a tray S is sufficient to bring about downwardly oriented movement of the platform along the guide rods 35, 36. The shaft 42 is rotatable in bearings 45 secured to the frame 41.

FIG. 3 shows the platform 22 in its uppermost position in which the bearing sleeves 33, 34 abut against stop rings 51, 52 provided on the guide rods 35, 36. The upper end faces of the lower bearing blocks 37, 38 support resilient stop rings 53, 54 which arrest the platform 22 in its lowermost position. The rings 53, 54 act as shock absorbing cushions for the bearing sleeves 33, 34 to prevent excessive shaking of a filled tray such as could cause shifting of cigarettes in the tray.

The brake mechanism BV is mounted at the right-hand end of the shaft 42, as viewed in FIGS. 3 to 5, and will be described in greater detail with reference to FIGS. 9 and 10. The right-hand end of the shaft 42 carries two bearing sleeves 57, 58 for two spaced antifriction bearings 55, 56. These bearings mount a brake disk 59. Between the bearings 55, 56, the shaft 42 supports the inner sleeve 61 of an overrunning or freewheeling clutch 60. The outer sleeve or mantle 64 of this clutch is provided with outwardly extending axially parallel teeth 62, 63 which extend into complementary notches or grooves 65, 66 of annular caps 47, 48, respectively, which are fixed to the opposite end faces of the brake disk 59 by bolts 47a, 48a. When the shaft 42 rotates in a sense to permit descent of the platform 22, the overrunning clutch 60 establishes a motion-transmitting connection between the shaft 42 and the brake disk 59. When the platform 22 is caused to move upwardly (counterweights 31, 32), the sleeve 61 rotates with respect to the mantle 64 without driving the brake disk 59.

The left-hand portion or hub 67 of the disk 59, as viewed in FIG. 10, constitutes a collar or journal bearing for a second brake disk 68 which is held against axial movements by the caps 47. The disk 68 has an annular flange 69 which is formed with an arcuate slot 70 having a center of curvature located in the axis of the shaft 42. The slot 70 accommodates a portion of a bolt 71 which is fixed to the brake disk 59 by a nut 71a and which projects beyond the left-hand end face of the flange 69 and into the path of an arcuate segment 72 adjustably fixed to the end face of the disk 68 in a manner shown in FIG. 9. The segment 72 has an open arcuate slot 73 which is in partial registry with the slot 70. By adjusting the angular position of the segment 72, an operator may change the effective length of the slot 70 in that the segment may overlap a greater or a smaller zone of the slot 70. The means for adjusting the segment 72 comprises two bolts 72a which extend through a second arcuate slot 72b of the segment and are screwed into the brake disk 68. The segment 72 and the bolt 71 control the extent of angular displacement of disk 68 with respect to the disk 59, the bolt 71 serving as a stop for arresting the disk 68 in two spaced end positions. The outer end of the bolt 71 has an annular groove 74 for one end of a helical spring 75 whose other end is attached to a spring holder pin 76 secured to the flange 69. This spring 75 tends to maintain the bolt 71 in that end of the slot 70 which is distant from the segment 72.

The brake disks 59, 68 respectively cooperate with brake shoes 77, 78. The shoe 77 is carried by a shaft 79 slidable in a bearing arm 81 (see FIG. 5) and biased by a helical spring 83 which tends to urge the shoe 77 against the periphery of the disk 59. The other shoe 78 is mounted on a shaft 80 slidably carried by a second bearing arm 82 (FIG. 5), and the shoe 78 is biased by a second helical spring 84 tending to move it into engagement with the periphery of the brake disk 68. Suitable pins (not shown) may be provided to prevent tilting of the brake shoes.

One end portion of the bearing arm 81 assumes the form of a sleeve 89 (FIG. 5) which is secured to the upper end of a rod 90; this rod 90 is slidable in two spaced bearings 91, 92 carried by a plate 93 which is fixed to or which forms part of the frame 41. The rod 90 is provided with a collar 94 which is engaged by a helical spring 95 tending to move the arm 81 downwardly by bearing against the underside of the bearing 91. The collar 94 abuts against the bearing 92, and the upper brake shoe 77 is maintained in engagement with the periphery of the brake disk 59.

The bearing arm 82 is provided with a sleeve 96 which is fixed to the rod 90 at a point below and in spaced relation from the lower bearing 92. As shown in FIG. 10, the shoe 78 is normally spaced from the periphery of the brake disk 68.

The lower end portion 102 of the plate 93 assumes the form of a hanger bearing having a bore which accommodates a pneumatic cylinder 104. The piston rod of this cylinder is secured to the rod 90 by adjustable nuts 107 and the cylinder is inoperative when the rod 90 assumes its lower end position. In other words, when the lower chamber of the cylinder 104 receives compressed air, the rod 90 is caused to move upwardly and entrains the arms 81, 82 in the same direction.

The lower end portion 109 of the shaft 80 for the lower brake shoe 78 assumes the form of a hook (see FIG. 5) and cooperates with a hook-shaped retaining element 112 which is pivotably mounted on a bolt 110 and is biased by a leaf spring (not shown) so as to normally engage the hook 109. The bolt 110 is mounted in a bifurcated portion 114 of a two-armed lever 113, and this lever is pivotable about a horizontal bolt 115 which is carried by the frame 41. The lower arm of the lever 113 carries a pin for a roller 117.

As shown in FIG. 3, the hanger bearing 102 carries an anchoring pin for one end of a helical spring 119 whose other end is secured to the bolt 110 so that the spring 119 tends to rock the lever 113 in a clockwise direction, as viewed in FIGS. 3 to 5, in order to move the roller 117 into the path of the trip 28 on the platform 22 and to disengage the hook 112 from the hook 109. When the hooks 109, 112 engage with each other, the upper brake shoe 77 may be moved away from the disk 59 solely by admitting compressed air into the cylinder 104. The lower shoe 78 remains spaced from the brake disk 68 as long as the hook 112 engages with the hook 109. Consequently, as long as the hooks 109, 112 remain in engagement, the platform 22 is free to descend to its lowermost position in which a tray supported by this platform assumes a position corresponding to that of the tray Sc shown in FIG. 2.

While the platform 22 descends along the transfer station Fs, i.e., along the vertical section R of the endless portion $Q_1$–R–$Q_2$–QF of that path which extends from the point T back to this point and toward the magazine B, as viewed in FIG. 2, a retaining means (shown in FIG. 13) engages and holds the cover SD in lifted position so that rows of cigarettes assembled by the lifter A may be transferred into the interior of the tray. When the tray is filled, the cover SD is permitted to descend and closes the open front side of the tray which faces the transfer assembly Fs not later than at the time when the tray is ready to move to its lowermost position along the section R. The cover SD descends to its closing position by gravity.

Figure 13:
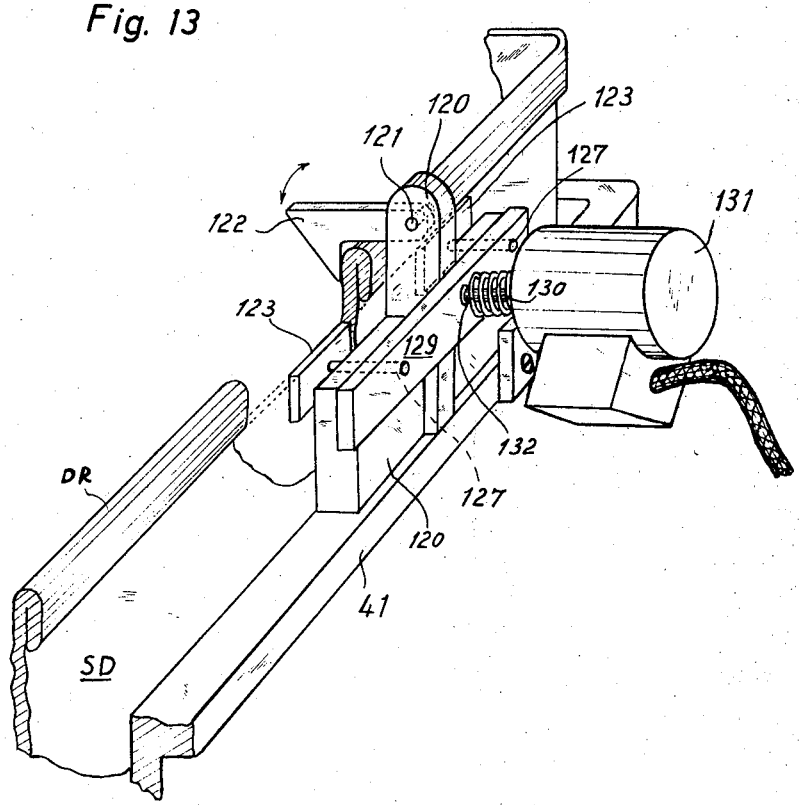
FIG. 13 is a perspective view of a retaining means which holds the cover of a tray in raised position while the tray descends along the transfer station.

The retaining means of FIG. 13 comprises a bracket or holder 120 which is fixed to the frame 41 (see also FIG. 5) and which carries a bolt 121 for a holding means here shown as a pivotable retaining hook 122. This hook engages the projecting portion or flange DR at the upper end of the cover SD when the flange is located above a pair of spaced supporting heads 123 mounted on studs 127 which are slidable in the bracket 120. The ends of studs 127 are secured in a strip shaped carrier 129 which is connected to the axially reciprocable core 130 of an electromagnetic motor 131. The motor 131 is located at the outer side of the cover SD and contains a coil which, when energized, withdraws the core 130 and the supporting heads 123 in a direction away from the flange DR so that the cover SD is free to descend to closing position by gravity. The heads 123 are normally held in supporting engagement with the inner side of the flange DR by a helical expansion spring 132 which operates between the housing of the motor 131 and the carrier 129.

The platform 22 carries an adjustable trip which engages a roller 358 (FIG. 5) when the platform descends so that the roller 358 actuates a switch 356 adapted to complete the circuit of the motor 131 when the tray supported by the platform 22 is filled with cigarettes. The core 130 is then retracted and entrains the heads 123 so that the cover SD drops into closing position.

The platform 22 further supports two adjustable actuating bars 136, 137 (FIG. 5). The bar 137 may actuate an upper air valve 138, and the bar 136 may actuate a lower air valve 139. The valves 138, 139 regulate flow of compressed air to the chambers of the pneumatic cylinder 300 which, as described hereinabove, causes the transporting arms $Q_1$ 20, 21 to move a tray along the section $Q_1$ which thereupon return the arms 20, 21 to their initial position in which they may engage and advance the next empty tray toward the platform 22. When the bar 137 actuates the valve 138, the platform 22 is in uppermost position and the valve 138 admits compressed air to the lower chamber of the cylinder 300 so that the longer arms 281 of the bell crank levers (FIG. 8) move the slides 265 and arms 20, 21 forwardly toward the platform. The other valve 139 is actuated when the platform has descended along the section R.

That part of the advancing means which transports a filled tray along the lower transverse section $Q_2$ comprises the aforementioned teeth 23 and certain other parts which are shown in FIG. 5. When the platform 22 descends along the section R and a newly filled tray reaches the intersection of the section R and $Q_2$, the lower ends of the side walls of such filled tray come to rest on a pair of fixed ways 303 which are secured to blocks 304 carried by the frame 41. The two portions of this part of the advancing means are mirror symmetrical to each other with respect to a vertical plane passing midway through the upright 1, as viewed in FIG. 3.

Figure 8:
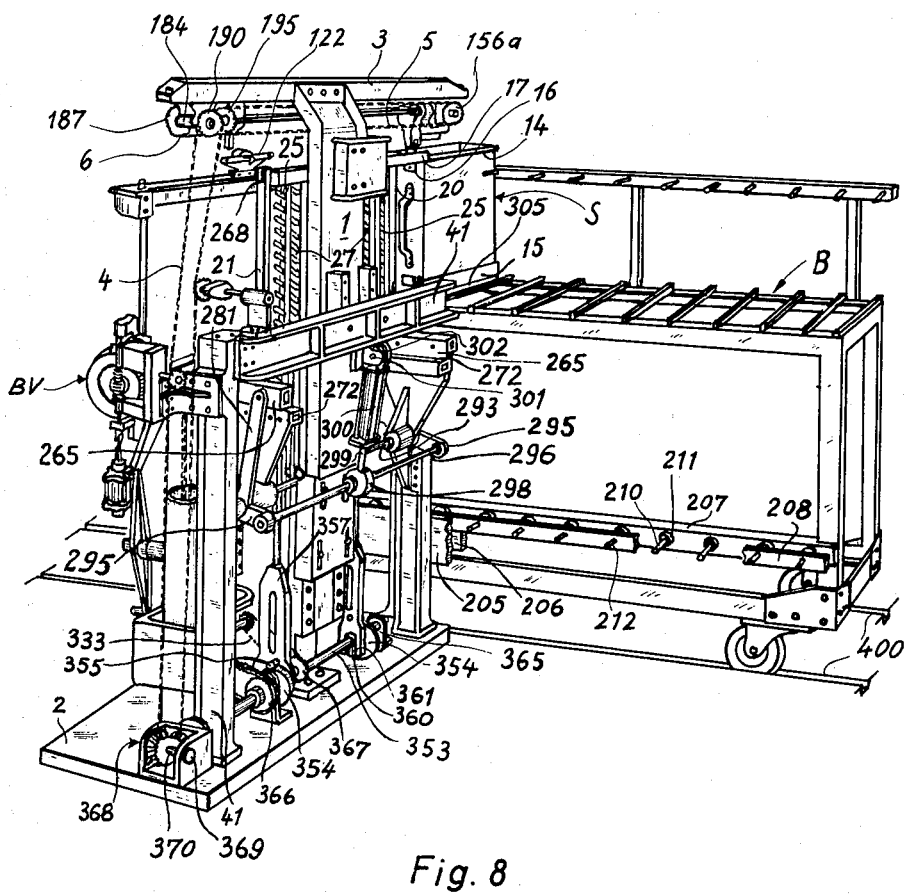
FIG. 8 is a perspective view of the circulating apparatus and of the magazine as seen in the direction of arrow VIII shown in FIG. 1.

The supporting batten 15 at the lower end of the tray S has a rearwardly extending horizontal ledge 305 (see FIG. 8). This ledge is engaged by a first tooth of each of two rows of five teeth 23 and the first tooth pushes the entire tray toward the respective second tooth 23, the second tooth advances the tray into the range of the respective third tooth, and so on until the tray completes its advance along the section $Q_2$. The teeth 23 of each row are tiltable about horizontal pivot pins mounted in horizontal carriages 306, and each tooth is bised by a spring to remain in operative position determined by a suitable stop against which the rear face of the tooth abuts under the bias of its spring. The carriages 306 are provided with channels or similar guide means 307 which slide along fixed parts of the frame 41. The frame 41 further supports a pair of aligned horizontal bolts 323 (see FIG. 4) each of which turnably supports a lever 324 having an upper arm articulately fixed to the respective carriage 306 and a lower arm shaped as a strap which is mounted on an adjustable eccentric 328. The eccentrics 328 are mounted on a horizontal shaft 331 whose ends are journalled in spaced bearing brackets 330 secured to the frame 41.

The shaft 331 is driven by a sprocket wheel 332, by a second sprocket wheel 367 (see FIG. 8) on the main drive shaft 353, and by a chain 333 which is trained around the wheels 332, 367. When the shaft 331 rotates, both sets of teeth 23 are caused to reciprocate with the respective carriages 306 and thereby bring about stepwise advance of a filled tray along the section $Q_2$.

Once the tray is moved to the intersection of sections $Q_2$ and QF, the teeth 25 and 27 of the next part of the advancing means take over and lift the tray to the intersection of the section QF with the path FB. This part of the advancing means further comprises two reciprocable upright bars 336 (see FIG. 3) which are spaced from the side walls of the tray and each of which is reciprocable in a pair spaced upper and lower bearings 334, 335. Each bar 336 supports a series of vertically spaced teeth 25 in the same way as described in connection with teeth 23, i.e., each tooth 25 is pivotable about a horizontal pivot pin and is biased by a spring into abutment with a suitable stop provided on the respective bar 336. Each pair of bearings 334, 335 is secured to an upright post 340 which is inwardly adjacent to the respective bar 336, and the posts 340 are secured to the opposite sides of the upright 1 in such a way that the supporting batten 15 of a newly filled tray is adjacent to the posts 340. Each post 340 carries a group of vertically spaced teeth 27. The teeth 27 are pivotable about horizontal pivot pins carried by the respective posts 340 and each tooth 27 assumes the shape of a two-armed lever. One arm of each lever is biased by a spring secured to the respective post 340 to assume an operative position in which it abuts against a stop. Such stops preferably assume the form of straps or clips which secure the springs for teeth 27 to the respective posts 340.

The upper end portions of the posts 340 carry the aforementioned swingable rail 19 which comes into supporting engagement with the batten 14 of a newly filled tray when the tray was lifted all the way along the section QF. The rail 19 comprises ways 350 whose length corresponds to shortest distance between the posts 340. When the rail 19 is free to assume a position dictated by gravity, the ways 350 are aligned with the rail 17 so that an empty tray advancing under the action of the chain 5 may move its batten 14 into engagement with the rail 19.

At each of its longitudinal ends, the rail 19 is provided with an inclined cam face, and such cam faces are engaged by an ascending tray while the latter advances along the section QF so that the rail 19 may be swung upwardly and thereupon reassumes its normal position to engage the batten 14 and to maintain a filled tray in suspended position.

The means for reciprocating the bars 336 derives motion from the main drive shaft 353 through eccentric cam disks 354 (FIG. 8). The periphery of each cam disk 354 is traced by a roller follower 355 whose hub is mounted on a pin secured to the lower end portion of a head 357 secured to the lower end of the respective bar 336. The lower end portion 361 of each head 357 assumes the form of a forked sliding block which receives a roller 360 mounted on the main drive shaft 353. The shaft 353 is rotatable in bearings 365 supported by the base 2 and is constantly driven by the gear motor GM through a chain 366. The left-hand end of the shaft 353, as viewed in FIG. 8, drives a bevel gear transmission 368 having an output shaft 369 for a sprocket wheel 370 which drives the chain 4.

The means for transporting the magazine B in the direction of arrow N operates in a direction at right angles to the first path FB. As shown in FIG. 8, a plate-like support 205 is screwed to the frame 41 in such a way that it is spaced from and is parallel with one side of the magazine B. This support carries a rail 206 which is secured thereto by means of bolts and spacer sleeves, and the rail 206 is aligned with a pair of spaced parallel horizontal rails 207, 208 provided on the magazine B. The rails 207, 208 are connected by bolts 210 each of which carries a roller 211 and each of which comprises an extension 212 serving as a stop for the purpose to be described later. The rollers 211 engage the upper face of the rail 206 so as to slightly lift one side of the magazine B. This rail 206 is received between the rails 207, 208 to properly guide the magazine along the support 205. The latter carries two bearing pins 213 (see FIG. 11 which shows one of these pins) each extending through a separate elongated slot 215 provided in a horizontal thrust rod 216. Each pin 213 is provided with a collar to maintain the rod at a given distance from the adjacent side of the support 205, and each of these pins comprises a cylindrical portion for a roller 218 which is mounted on needle bearings. The hubs of rollers 218 are held in fixed position by washers 221 and nuts 220. The rollers 218 are accommodated in the respective slots 215 and the washers 221 simultaneously serve as a means for guiding the thrust rod 216 against lateral displacements.

One side of the thrust rod 216 supports a motion transmitting element 222 which is adjacent to one end thereof and which is pivotable about a pin 223. The element 222 assumes the form of a two-armed lever having a shorter arm 224 which carries a bracket 226 for a spring holder 225 cooperating with a second spring holder 227 provided on a plate 228 adjustably fixed to the underside of the thrust rod 216 at a point adjacent to and located below the longer arm of the element 222. A spring 229 whose ends are anchored in holders 225, 227 tends to pivot the element 222 in an anticlockwise direction, as viewed in FIG. 11, i.e., the spring 229 tends to move the bracket 226 closer to the plate 228.

The other side of the thrust rod 216 carries a second motion transmitting element 230 which is pivotable about a pin 231 and which again assumes the form of a two-armed lever having a shorter arm 232 provided with a bracket 234 for a spring holder 233. A second adjustable plate 236 is fixed to the underside of the thrust rod 216 beneath the element 230 and is provided with a spring holder 235 for one end of a helical spring 237 whose other end is anchored in the holder 233 and which tends to pivot the arm 234 toward the plate 236.

A median portion of the thrust rod 216 carries a plate-like bifurcated member 239 which is formed with a downwardly opening slot 238 for a roller 240 rotatable about a horizontal pin 242. This pin 242 is fixed to the upper arm of a lever 241 whose lower arm is pivotable about a pin 243 secured to the frame 41 (see FIG. 4). A median portion of the lever 241 is connected with a horizontal pin 244 mounted in a bifurcated member 245. The member 245 is adjustably coupled to the piston 248 of the pneumatic cylinder 249 by means of a nut 247. The cylinder 249 is turnable on stub shafts 250 which are mounted in a bifurcated bearing block 251 carried by the plate support 205.

One end of the pin 244 assumes the shape of a spring holder for the adjacent end of a helical spring 253 whose other end is anchored in a holder 254 provided at the lower end of an arm 255 secured to the left-hand end of and extending downwardly from the thrust rod 216 (as viewed in FIG. 11). Adjacent to its upper edge, the rod 216 carries an arm 256 for an adjustable pin 257 which carries a pawl 258 in such a way that the pawl is readily turnable about the axis of the pin 257. The pallet of the pawl 258 is provided with a notch or recess 259 for one of the extensions 212. The median portion of the pawl 258 carries a downwardly extending lug 260.

FIG. 3 shows that the front end portions of the plate support 205 and rail 206 carry a spacer element 261 which is provided with a tapped bore for an adjustable screw 263, the latter serving as a stop for the thrust rod 216.

The circulating apparatus of our invention operates as follows:

A magazine B containing a supply of say twelve empty trays S is coupled to the circulating apparatus by pushing it along ways 400 (see FIG. 8) so that each of its rollers 211 travel along the upper face of the rail 206 and that its rails 207, 208 advance along the opposite sides of and are guided by the rail 206. The magazine is brought to a halt when the notch 259 of the pawl 258 receives the foremost extension 212 (FIG. 11). The foremost empty tray is now aligned with the first path FB and may be engaged by the first path FO of the advancing means. When the magazine B assumes such position, the upwardly extending lug 16 of the foremost empty tray automatically enters the cutout 141 in the underside of the bar 140 (see FIG. 7) as well as the recess 163 in the lower end face of the trip 162. As explained hereinabove, the bottom wall 164 in the recess 163 is inclined to form a cam face which enables the lug 16 to pivot the lever 160 about the axis of the shaft 158 and to simultaneously pivot the lever 159 in an anticlockwise direction, as viewed in FIG. 7, so that the roller 166 at the free end of the lever 159 pivots the ratchet lever 146 which is secured to the carriage 9 (namely, to the turnable bolt 145 on the bar 140 which is suspended on the carriage) and the lever 146 engages the chain 5 to entrain the carriage and the foremost empty tray in a direction indicated in FIG. 7 by an arrow 5a. At the same time, the lever 147 pivots about the axis of the bolt 145 and its end moves away from the chain 6 which latter is driven in the direction of arrow 6a. Since the chains 5, 6 are driven without interruptions, the reversing mechanism 10 (including the above described parts 140, 162, etc.) now couples the carriage 9 to the chain 5 and the carriage moves the empty tray along the first path FB toward the upper transverse section $Q_1$ of the second path.

As the foremost empty tray is moved off the magazine B, its upper batten 14 slides along the fixed guide rail 17 and its lower batten 15 travels along suitable guideways of the frame 41 (see FIG. 8) to prevent a tilting of the tray, i.e., the tray remains parallel with itself in the same upright position in which it was supported on the magazine.

Since the pivotable rail 19 is free to follow the force of gravity, it is aligned with the rail 17 and its ways 350 supportingly receive the upper batten 14. When the tray reaches the intersection of first path FB with the upper section $Q_1$ of the second path, the carriage 9 is disconnected from the chain 5 in a fully automatic way because the roller 202 on the stud 203 (FIG. 6) is located in the way of the ratchet lever 146 and pivots this lever about the axis of the bolt 145 to move the lever away from the chain 5. The tray is now suspended on its batten 14 which is received in the ways 350 of the rail 19, and the batten 14 is located slightly above the transporting arms 20, 21 which then assume the position of FIG. 3. As explained hereinabove, the upper sides of the rails 272 assume the form of cam faces which are configurated in such a way that the slides 265 and the arms 20, 21 are raised before they begin to advance along the section $Q_1$ of the second path so that the batten 14 is lifted off the rail 19 and thereupon participates in forward movements of the arms 20, 21 toward the intersection of section $Q_1$ with the vertical section R. The cam faces of the rails 272 are shown in FIG. 3.

The batten 14 remains suspended on the arms 20, 21 (i.e., on the lugs 268 of these arms) until the platform 22 reaches the upper end of its movement along the section R. The movements of the slides 265 and arms 20, 21 are triggered in the following manner: A tray which was filled ahead of the empty tray momentarily suspended on the lugs 268 of the arms 20, 21 has been moved with the platform toward the intersection of vertical section R with the lower transverse section $Q_2$. At the time when or shortly before the filled tray reaches the forward end of the section $Q_2$, the bar 136 on the platform 22 actuates the air valve 139 (FIG. 5) to admit compressed air to the lower chamber of the cylinder 300 (FIG. 8) in order to withdraw the piston rod 299 in upward direction and to rock the shaft 296 anticlockwise, as viewed in FIG. 8, whereby the longer arms 281 of the two bell crank levers cause the slides 265 to move along the rails 272 and to entrain the arms toward the upper end of the section R subsequent to lifting of the batten 14 off the ways 350 on the rail 19.

When the arms 20, 21 reach the forward end of the section $Q_1$, the projecting portion or flange DR of the empty tray has been pushed against the downwardly inclined nose of the hook 122 which pivots clockwise, as viewed in FIG. 13, and permits the flange DR to engage the upper faces of the supporting heads 123. As soon as the flange DR is in proper engagement with and is supported by the heads 123, the hook 122 returns by gravity to the position of FIG. 13 and thereby holds the flange against the heads 123. The coil of the motor 131 is not energized so that the spring 132 is free to bias the heads 123 against that portion of the cover SD which is immediately adjacent to the flange DR and to simultaneously insure that the underside of the flange is properly suspended on the upper faces of the supporting heads 123.

Furthermore, when the filled tray reaches the lower end of the section R and is entrained by teeth 23 along the section $Q_2$, the counterweights 31, 32 are in a position to lift the platform 22 toward the upper end of the section R so that the platform moves into supporting engagement with the empty tray whose upper batten 14 is suspended on the lugs 268 of the arms 20, 21 at the upper end of the section R. The platform actually lifts the batten 14 off the empty tray above the lugs 268 and its bar 132 simultaneously actuates the air valve 138 to admit compressed air to the upper chamber of the cylinder 300 whereby the longer arms 281 of the bell crank levers return the arms 20, 21 to the intersection of section $Q_1$, with the first path FB because the shaft 296 is then rocked in a clockwise direction, as viewed in FIG. 8.

The inertia of the ascending platform 22 causes it to lift the empty tray off the lugs 268 on arms 20, 21, whereupon the combined weight of the platform and of the empty tray prevails and the platform begins to descend along the section R to move the empty tray along the transfer station Fs. Such downward movement of the platform 22 is controlled by the brake mechanism BV which is mounted on the shaft 42. As explained hereinabove, the shaft 42 carries the sprocket wheels 43 for the chains 29, 30 on which the platform 22 is suspended so that the platform is under full control of the brake mechanism BV when it moves downwardly because the overrunning clutch 60 then couples the brake disk 59 with the shaft 42. The brake mechanism BV permits intermittent movements of the platform 22 and acts in such a way that the platform may descend through a distance approximating the diameter of a cigarette after each consecutive transfer of a newly assembled row of cigarettes into the tray supported by the platform 22. At the time the platform 22 has removed an empty tray from the lugs 268 of arms 20, 21, the mechanism BV blocks the shaft 42 and prevents descent of the platform.

The brake mechanism BV operates as follows:

At the time the platform 22 has reached an empty tray, the combined weight of the platform and of the tray tends to rotate the shaft 42 in a direction to permit downward movement of the platform along the section R. However, the shoe 77 (FIGS. 5 and 9, 10) engages the periphery of the disk 59 and thereby blocks the shaft 42. The loading assembly Fu comprises a ram which is aligned with rows of cigarettes assembled by the lifter A and which is reciprocable in a horizontal plane to move a newly assembled row of cigarettes onto the bottom wall of the tray S at the transfer station Fs. This ram actuates an air valve (not shown) which controls the admission of compressed air to the cylinder 104 in a sense to move the piston rod 106 of this cylinder in upward direction and against the bias of the spring 95 in order to move the rod 90 upwardly and to lift the shoe 78 into engagement with the brake disk 68 shortly before the shoe 77 is moved away from the brake disk 59. The shaft 42 is now free to turn through an angle corresponding to the effective length of the slot 70 (see FIG. 9), i.e., corresponding to the angular distance covered by the bolt 71 in that portion of the slot 70 which is not covered by the segment 72. Such angular distance corresponds to the distance which the platform 22 must cover in order to move a tray into a position necessary for reception of the next row of cigarettes.

The aforementioned ram of the transfer assembly Fu thereupon actuates a second air valve (not shown) which permits escape of compressed air from the cylinder 104 whereby the spring 95 is free to return the shoe 77 into engagement with the brake disk 59 and to simultaneously move the shoe 78 away from the disk 68. In other words, the shaft 42 is again blocked by the shoe 77 but the disk 68 is free to rotate with respect to the disk 59 under the bias of the spring 75 which moves the bolt 71 back to the position of FIG. 9, namely, to the left-hand end of the slot 70. The same operation is then repeated as often as is necessary to stack in the tray a requisite number of rows. Whenever the ram of the transfer assembly transfers a row of cigarettes into the tray carried by the platform 22, the ram actuates the aforementioned air valves which cause the cylinder 104 to move the shoe 77 away from the disk 59 and to move the shoe 78 against the disk 68 or vice versa. The segment 72 is adjusted when it becomes necessary to transfer cigarettes or other articles of different diameter or if the initial adjustment of distances through which the platform 22 descends along the section R requires correction.

When the tray carried by the platform 22 reaches its lowermost position, the trip 28 on the platform 22 pivots the lever 113 about the axis of the bolt 115 (FIG. 5) in order to move the retaining element 112 into engagement with the hook 109 at the lower end of the shaft 80 for the lower brake shoe 78. Consequently, the shoe 78 is prevented from moving into engagement with the disk 68 and, during transfer of the last row of cigarettes, the ram of the transfer assembly Fu again actuates the aforementioned valve which admits compressed air to the cylinder 104 so that the rod 90 descends against the bias of the spring 95 and moves the shoe 77 away from the disk 59. However, since the retaining element 112 holds the shoe 78 away from the disk 68, the brake mechanism BV cannot prevent further descent of the platform 22 to its lowermost position. As explained hereinabove, the lower blocks 37, 38 for the guide rods 35, 36 are provided with shock absorbing rings 53, 54 which arrest the platform 22 in its lowermost position.

Before the transfer assembly Fu delivers a new row of cigarettes into an empty tray which is already located at the intersection of the first path FB with the upper transverse section $Q_1$ of the second path, the circulating apparatus carries out a series of rapidly following operations in the following manner:

(a) At the time the platform 22 reaches the lower end of the section R, it causes the transporting arms 20, 21 to advance an empty tray to the upper end of the section R in that its bar 136 actuates the valve 139 which admits compressed air to the cylinder 300. Consequently, the arms 20, 21 advance an empty tray to the intersection of section $Q_1$ with the section R.

(b) The teeth 23 remove the filled tray from the platform 22 and the latter is free to ascend toward the arms 20, 21 and to receive the empty tray by lifting the batten 14 off the lugs 268.

(c) As the platform 22 ascends, its trip 28 moves away from the lever 113 and the latter disengages the retaining element 112 from the hook 109 so that the lower brake shoe 78 may be controlled by the cylinder 104. Of course, the cylinder 104 is idle because the ram of the transfer assembly has actuated the valve which permits escape of compressed air from this cylinder whereby the shoe 77 is free to return into engagement with the brake disk 59.

(d) Owing to the provision of the overrunning clutch 60, the shaft 42 is free to rotate with respect to the brake mechanism BV when the platform 22 ascends toward the arms 20, 21 since the clutch 60 is operative only when the shaft 42 rotates in a sense to permit downward movement of the platform 22. Thus, the fact that the disk 59 is engaged by the shoe 77 has no bearing on the rotation of shaft 42 when the latter rotates in a sense to permit upward movement of the platform 22.

(e) When the platform 22 reaches the upper end of the section R, its bar 137 actuates the air valve 138 to return the arms 20, 21 to the intersection of path FB with the section $Q_1$.

(f) The flange DR of the cover SD forming part of an empty tray which is located at the upper end of the section R is engaged by the holding hook 122 and rests on the supporting heads 123 so that the cover is held in raised position.

It should be mentioned here that the cover SD of a filled tray (located at the lower end of the section R) is automatically released by the roller 358 (FIG. 5) which trips the switch 356 so that the latter may complete the circuit of the coil in the motor 131 in order to withdraw the core 130 against the bias of the spring 132. Therefore, the heads 123 are withdrawn from supporting engagement with the flange DR and the cover SD is free to descend by gravity in order to close the open front side of the tray.

After completion of the above described operations, the ram of the transfer assembly can advance the first row of cigarettes into the empty tray on the platform 22. The newly filled tray, with its cover SD in closing position, comes to rest on the fixed ways 303 of that part of the advancing means which operates along the lower transverse section $Q_2$. The teeth 23 reciprocate without interruption and immediately entrain the tray along the ways 303 toward the lower end of the section QF, i.e., into the range of teeth 25 which engage the upper batten 14 and advance the filled tray along the section QF toward the intersection of this section with the first path FB. The teeth 27 assist the teeth 25 to prevent downward movement of a filled tray at the time the teeth 25 move downwardly. When the filled tray is lifted by the uppermost pair of teeth 25, its batten 14 first pivots the rail 19 upwardly and the rail thereupon returns to its operative position to supportingly engage the batten 14, i.e., this batten comes to rest in the ways 350 of the rail 19 and is suspended at the left-hand end of the first path FB, as viewed in FIG. 2. At the same time, the lug 16 of the filled tray enters the cutout 141 of the bar 140 which is properly aligned with this lug because the carriage 9 was arrested in such position after having delivered an empty tray to the rail 19. The lug 16 also enters the recess or cutout 200 of the trip 199 (see FIG. 6) so that it pivots the lever 197 about the axis of the bolt 196. The lever 197 pivots the ratchet lever 147 toward and into engagement with the constantly moving chain 6 and the latter entrains the filled tray along the path FB and back onto the magazine B. The ratchet lever 146 is disengaged from the chain 5 and is engaged by the flange 169 of the extension 168 so that it is pivoted anticlockwise, as viewed in FIG. 7, and thereby disengages the lever 147 from the chain 6. However, the extension 168 and its flange 169 are mounted in such a way that the lever 146 does not engage the chain 5; thus, both levers 146, 147 are now disengaged and the carriage 9 is brought to a halt in requisite position to arrest the filled tray on the magazine B.

When the carriage 9 reaches such extreme position, its block 175 has depressed the lever 177 (FIG. 7) so that the latter actuates the air valve 178 to admit compressed air to the cylinder 249 (FIG. 4) which transports the magazine B through a distance corresponding to the thickness of a single tray. This means that an empty tray is now aligned with the first path FB, and the operation is then repeated in the above described sequence until the supply of empty trays on the magazine B is exhausted. As a rule, the magazines are coupled one behind the other so that a new magazine is automatically moved into requisite position as soon as the preceding magazine is completely occupied with filled trays. An empty tray remains in the circulating apparatus when a magazine B is fully loaded because the space taken up by the last filled tray was vacated by an empty tray which is still in the apparatus when the last filled tray is deposited on the magazine.

When the cylinder 249 receives a supply of compressed air, its piston rod 248 rocks the lever 241 in a clockwise direction, as viewed in FIG. 4, and the thrust rod 216 (FIG. 11) is moved against the bias of the spring 253 through a distance necessary to transport an empty tray into alignment with the first path FB. During such movement of the thrust rod 216, the motion-transmitting lever 230 travels beneath the downwardly extending lug 260 and pivots the pawl 258 in a sense to move its notch 259 away from the stop 212. The lever 222 then engages the next extension 212 and moves it beneath the notch 259 before the pawl 258 descends in order to accommodate the next extension in the notch 59. In the next step, the carriage 9 advances an empty tray along the first path FB and toward the upper transverse section $Q_1$ of the second path in a manner as described above.

When the carriage 9 moves away from the magazine B, its lever 177 moves away from the valve 178 which permits compressed air to escape from the cylinder 249 so that the spring 253 is free to return the thrust rod 216 to its initial position. Since the thrust rod 216, its motion transmitting elements 222, 230 and the piston rod 248 of the cylinder 249 are adjustable, an operator may readily correct any inaccuracies in the transport of empty trays into alignment with the first path FB to make sure that the batten 14 of the foremost empty tray on the magazine B is properly aligned with the rail 17 at the time it is engaged by the carriage 9.

It will be noted that we provide a circulating apparatus whose operation is fully automatic and which is capable of advancing empty trays toward and along the transfer station of a cigarette making and handling machine while simultaneously advancing a filled tray away from the transfer station. The operation of the circulating apparatus is started when the lug 16 of a tray engages the trip 162, whereupon the apparatus automatically circulates, returns and withdraws the trays in synchronism with operation of the transfer assembly. All such parts of the apparatus which must change their positions when the nature of dimensions of articles stored in the trays are changed are readily adjustable so that the apparatus may be rapidly converted for use with different types of cigarettes, cigars, cigarillos, filters and other articles which by themselves or together with other articles form tobacco-containing products.

The second path in one section (R) of which the trays travel along the transfer station Fs is located in a vertical plane which is perpendicular to the first path FB, and it will be noted that this second path comprises a portion between the point T and the magazine B, as viewed in FIG. 2, which coincides with the first path FB and which terminates at the magazine B. In other words, the composite path FB, $Q_1$, R, $Q_2$, FB in which a tray travels from the magazine B toward and along the station Fs of the transfer assembly Fu and back to the magazine comprises two coinciding portions which terminate at the magazine.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a machine for making and handling cigarettes and similar rod-shaped articles, in combination, a magazine adapted to support a supply of storing devices; an assembly for step-by-step transferring rows of coplanar parallel articles into empty storing devices; and an apparatus for circulating empty storing devices from said magazine toward and along said assembly and back to said magazine, said apparatus comprising advancing means for consecutively moving empty storing devices in a first path from said magazine toward said assembly and for consecutively returning in a second path to said magazine such storing devices which are filled while moving along said assembly, said paths having coinciding portions which terminate at said magazine and said second path including a vertical section along which the storing devices move step-by-step past said transferring assembly, which transferring assembly intermittently transfers rows of coplanar articles into said step-by-step vertically moving storing devices.

2. In a machine for making and handling cigarettes and similar rod-shaped articles, in combination, a magazine adapted to support a supply of storing devices; an assembly for step-by-step transferring rows of coplanar parallel articles into empty storing devices; and an apparatus for circulating empty storing devices from said magazine toward and along said assembly and back to said magazine, said apparatus comprising advancing means for consecutively moving empty storing devices in a first path from said magazine toward said assembly and for consecutively returning in a second path to said magazine such storing devices which are filled while moving along said assembly, said paths having coinciding portions which terminate at said magazine and said second path having an endless second portion which is located in a vertical plane, said endless second portion including a vertical section along which the storing devices move step-by-step past said transferring assembly, which transferring assembly intermittently transfers rows of coplanar articles into said step-by-step vertically moving storing devices.

3. A combination as set forth in claim 2, wherein said advancing means comprises counterweights for the storing devices descending along said vertical section.

4. In a machine for making and handling cigarettes and similar articles, in combination, a magazine adapted to support a supply of storing devices of the type having an open front side and a cover movable along such front side between a raised position and a closing position; an assembly for transferring articles into empty storing devices; an apparatus for circulating empty storing devices from said magazine toward and along said assembly and back to said magazine, said apparatus comprising means for consecutively advancing empty storing devices in a first path from said magazine to said assembly and for consecutively returning in a second path to said magazine such storing devices which are filled while moving along said assembly, said paths having coinciding portions which terminate at said magazine and said second path having an endless second portion which is located in a vertical plane, said second portion comprising a vertical section along which the storing devices descend while moving along and while having their front sides turned toward said assembly; and retaining means cooperating with said advancing means for maintaining the covers of descending storing devices in raised position and for automatically releasing the covers not later than at the time the storing devices terminate their movement along said vertical section.

5. A combination as set forth in claim 4, wherein the cover of each storing device comprises a projecting portion, said retaining means comprising supporting means engaging such projecting portion while a storing device descends along said section, and means automatically disconnecting said supporting means from the respective projecting portion when the storing device descends through a predetermined distance along said vertical section.

6. A combination as set forth in claim 5, wherein said supporting means engages one side of the projecting portion and wherein said retaining means further comprises means for holding the projecting portion on said supporting means.

7. In an apparatus for circulating storing devices for cigarettes and similar rod-shaped articles from a magazine toward and along a transfer station and back to the magazine, in combination, advancing means comprising a first part for consecutively removing empty storing devices from the magazine while moving in a first direction and for consecutively returning filled storing devices to the magazine while moving in the opposite direction, and a second part cooperating with said first part for receiving empty storing devices from said first part, for advancing such empty storing devices along the transfer station at which the storing devices are filled, and for returning thus filled with rows of parallel coplanar articles storing devices to said first part so that filled storing devices may be returned to the magazine, said second part comprising means for moving storing devices vertically downwardly and in stepwise fashion while such storing devices advance along said transfer station so that a row of articles may be transferred subsequent to each stepwise advance of a storing device.

8. In an apparatus for circulating storing devices for cigarettes and similar rod-shaped articles from a magazine toward and along a transfer station and back to the magazine, in combination, advancing means comprising a reciprocable first part for consecutively removing empty storing devices from the magazine and for advancing empty trays in a substantially horizonal first path and away from the magazine while moving in a first direction and for returning filled trays to the magazine while moving in the opposite direction, and a second part for moving empty trays received from said first part in an endless second path along the transfer station where the trays are filled with rows of parallel coplanar articles and back to the first path so that the first part of said advancing means may return filled trays to the magazine, said second path having a vertical section in which the storing devices descend in stepwise fashion during travel along said transfer station so that a fresh row of articles may be transferred subsequent to each stepwise advance of a storing device along said station.

9. A combination as set forth in claim 8, wherein said second path is located in a vertical plane making right angles with said first path, said second path further having an upper horizontal section which intersects said first path, a lower horizontal section which is parallel with and in which filled trays leaving said vertical section are advanced in a direction opposite to the direction of their movement along said upper horizontal section, and a second vertical section along which the trays move upwardly toward the intersection of said first path with said upper horizontal section.

10. In a machine for making and handling cigarettes and similar rod-shaped articles, in combination, a magazine adapted to support a supply of storing devices; an assembly for transferring rows of parallel coplanar articles into empty storing devices; an apparatus for circulating empty storing devices from said magazine toward and along said assembly and back to said magazine, said apparatus comprising advancing means for consecutively moving empty storing devices in first path from said magazine toward and along said assembly and for consecutively returning in a second path to said magazine such storing devices which are filled while moving along said assembly, said paths having coinciding portions which terminate at said magazine and said first path having a vertical section in which the storing devices descend in stepwise fashion during travel past said assembly so that a fresh row of articles may be transferred subsequent to each stepwise advance of that storing device which advances along said assembly; and means for intermittently transporting said magazine upon withdrawal of each empty storing device through such distances that a new empty storing device is moved into alignment with said first path.

11. A combination as set forth in claim 10, wherein said transporting means cooperates with and is actuated by said advancing means to transport the magazine subsequent to return of a filled storing device onto the magazine.

12. A combination as set forth in claim 10, wherein said magazine is a wheel-mounted conveyance.

13. A combination as set forth in claim 10, wherein said transporting means comprises a pneumatic cylinder mounted on the circulating apparatus and thrust rod means reciprocable by said cylinder and detachably coupled with said magazine.

14. In a machine for making and handling cigarettes and similar articles, in combination, a magazine adapted to support a supply of storing devices; an assembly for transferring articles into empty storing devices; and an apparatus for circulating empty storing devices from said magazine toward and along said assembly and back to said magazine, said apparatus comprising advancing means for consecutively moving empty storing devices in a first path from said magazine toward said assembly and for consecutively returning in a second path to said magazine such storing devices which are filled while moving along said assembly, said paths having coinciding portions which terminate at said magazine and said advancing means comprising a reciprocable first part for moving empty trays along the coinciding portions of said paths, said first part comprising a carriage including means for detachably coupling it to a tray at each end of said coinciding portions, a pair of chains having runs moving in opposite directions along the coinciding portions of said paths, means for automatically coupling said carriage with one of said chains when the carriage reaches that end of said first path which terminates at said magazine so that the carriage entrains an empty tray to the other end of said first path, and means for automatically coupling the carriage with the other chain so that the other chain moves the carriage along the coinciding portion of said second path and toward the magazine when the carriage is engaged by a filled tray.

15. In a machine for handling cigarettes and similar rod-shaped articles, in combination, a magazine adapted to support a supply of storing devices; an assembly for step-by-step transferring rows of parallel coplanar articles into empty storing devices; and a circulating apparatus comprising means for automatically advancing empty storing devices from said magazine to and past said assembly at which the storing devices are filled and for returning thus filled storing devices in a path having coinciding portions along which empty storing devices are advanced from and along which filled storing devices are returned to said magazine, said path also having a vertical section along which the storing devices move step-by-step past said transferring assembly, which transferring assembly intermittently transfers rows of coplanar articles into said step-by-step vertically moving storing devices.

16. A combination as set forth in claim 15, wherein said advancing means comprises a brake mechanism cooperating with said assembly for controlling the stepwise advance of storing device along said section.

References Cited by the Examiner

UNITED STATES PATENTS

| 2,351,693 | 6/1944 | Molines et al. | 53—236 |
|---|---|---|---|
| 2,572,650 | 10/1951 | Molins | 53—236 |
| 3,018,594 | 1/1962 | Phillips et al. | 53—373 XR |

FRANK E. BAILEY, *Primary Examiner.*

TRAVIS S. McGEHEE, A. E. FOURNIER, *Examiners.*